Dec. 8, 1959   F. O. BERG   2,915,793
COMBINED WINDOW AND SCREEN ASSEMBLY
Filed Feb. 19, 1957
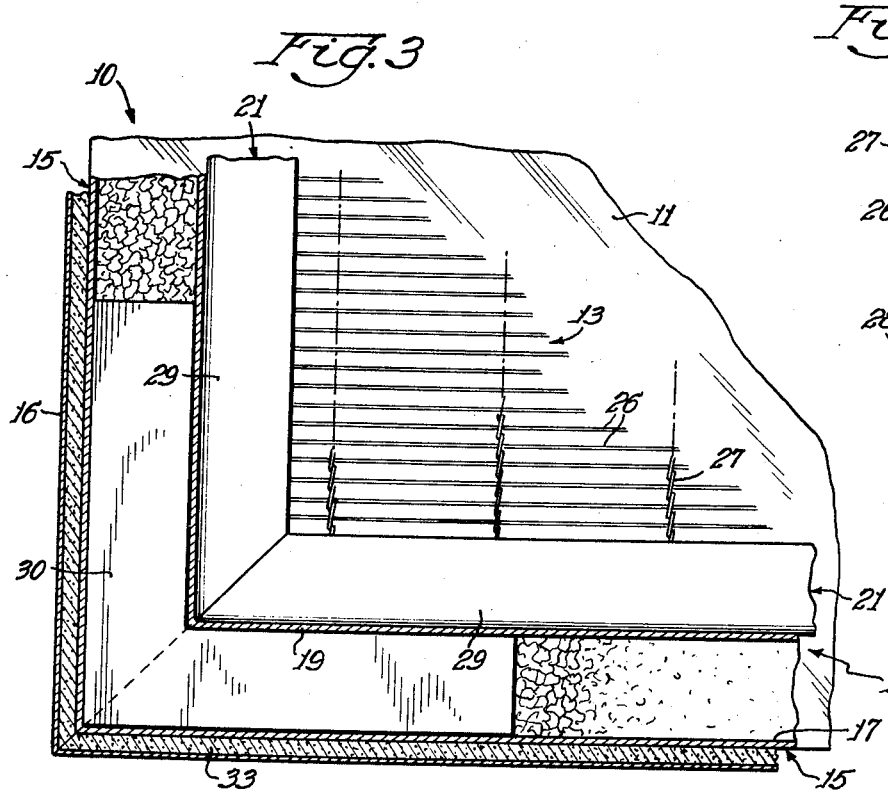
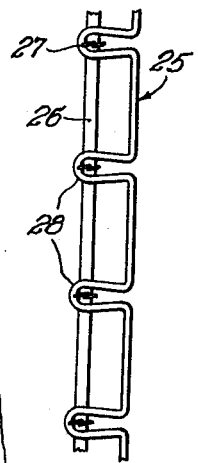
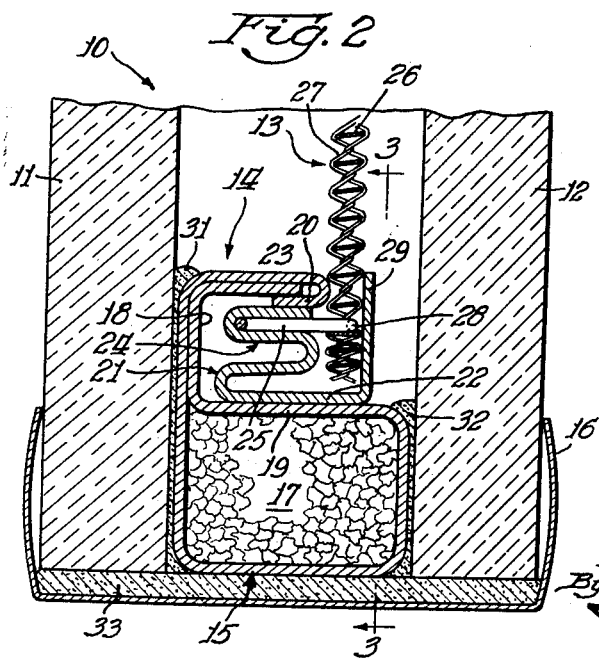
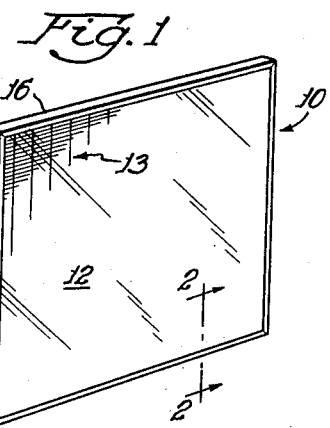
Inventor:
Forrest O. Berg
By: Frank C. Parker
Atty.

United States Patent Office 2,915,793
Patented Dec. 8, 1959

2,915,793

COMBINED WINDOW AND SCREEN ASSEMBLY

Forrest O. Berg, Fox Lake, Ill., assignor to Reflectal Corporation, Chicago, Ill., a corporation of Illinois Application February 19, 1957, Serial No. 641,111

5 Claims. (Cl. 20—56.5)

The present invention relates generally to improvements in windows and more particularly to improvements in multiple glass sheet glazing units comprising spaced parallel sheets of glass and having shade screen means disposed between the sheets of glass.

The present invention comprises an improvement over the similar structure disclosed in my copending application Serial No. 572,467, filed March 19, 1956, now Patent No. 2,874,423, issued February 24, 1959.

It is conventional to utilize glazing units comprising spaced parallel sheets of glass mounted within suitable framing devices in a manner so as to substantially seal the glass sheets with respect to the framing members in order to provide a dead air space between the glass sheets. Such glazing units are particularly effective in diminishing heat loss from buildings in cold climates and in minimizing the admission of heat into buildings in hot climates, particularly where the building is air conditioned. However, it has been found in modern buildings, where it is customary to employ large expanses of glass and where, at the same time, it is impractical to provide shading devices, such as roof overhangs, hedges, etc. that during those periods of the year when the sun is at a low angle above the horizon, a substantial amount of radiation into the building through the glazing units occurs. In some instances, this radiation is sufficient to make it so hot within the buildings as to be extremely uncomfortable. In order to overcome this phenomenon the glazing units are commonly shaded in some way, such as by awnings, for example.

This inherent drawback to multiple glazing units, when used in modern buildings having such large expanses of glass areas, has been recognized heretofore and it has been proposed to mount a shade screen, as is shown in the patent to Ewing 2,194,222, between the spaced parallel sheets of glass. Various means for mounting such shade screen between the glass sheets have been proposed but heretofore none of these mounting means has proved to be quite so satisfactory or as effective as the mounting means disclosed herein.

Further, it has been found in multiple glass sheet glazing units that any perceptible moisture content within the enclosed dead air space between the glass sheets tends to cause fogging of the glass sheets during particularly cold weather. This is undesirable and the present mounting means for mounting the shade screen between the glass sheets and maintaining the spaced relation between the glass sheets is designed so as to enclose a suitable moisture absorbent material adapted to absorb the moisture contained in the dead air and to thereby minimize the tendency for the glass sheets to become fogged during cold weather when such moisture would tend to condense upon the relatively cold panes of glass.

The principal object of the present invention is therefore to provide an improved means for mouting shade screen, of the type disclosed in the aforementioned patent to Ewing 2,194,222, between two parallel panes of glass in such a manner that all of the desirable features of sealed multiple glazing units are retained and so that the shade screen is held in position between the glass panels by means which render the overall assembly of the unit simple and economical.

Other objects and advantages of the present invention will become apparent from the following detailed description when taken in conjunction with the accompanying drawing, wherein:

Fig. 1 is a view illustrating a glazing unit of the general type to which the present invention is particularly applicable;

Fig. 2 is a sectional view taken substantially along the line 2—2 in Fig. 1 and illustrating the structural details of the mounting means comprising the subject matter of the present invention;

Fig. 3 is a fragmentary view, shown partly in section, taken along the line 3—3 in Fig. 2 and looking in the direction of the arrows, this view further illustrating the corner construction of the multiple glass sheet glazing unit comprising the subject matter of the present invention; and Fig. 4 is a view illustrating the retainer means utilized to hold the screen in a taut condition between the opposed vertical frame members of the glazing unit.

With reference to the drawing, wherein like reference numerals have been utilized to identify identical parts in each of the several views, there is shown in the figures a combined window and screen glazing unit illustrated generally by reference numeral 10. The glazing unit comprises two parallel sheets of glass 11 and 12 and a piece of shade screen 13 which are mounted in parallel relation with respect to each other by suitable framing devices indicated generally by reference numeral 14.

The framing devices 14 together form a substantially rectangular frame of suitable size and comprise a first member 15, which serves principally as a spacing member and as a member for mounting the screen 13 and an enclosing metal holding member 16. The members 15 and 16 are disposed at the marginal edges all the way around the glazing unit.

Each of the members 15 comprises, preferably, an extruded aluminum shape formed to provide a cavity 17 and an elongated recess 18 opening substantially in the plane of the screen 13. The recess 18 is defined by portions 19 and 20 of the framing member 15 and suitable inserts, represented generally by reference numeral 21 are provided for disposition within the recesses 18 in order to hold the screen 13 in a taut condition between the parallel panes of glass 11 and 12. The inserts 21 are formed of sheet metal with the cross sectional shape substantially as is shown in Fig. 2. The inserts 21 thus comprise a portion 22 which engages portion 19 of framing member 15 and a portion 23 which engages member 20 in order to retain the insert within the recess 18. The insert 21 is also formed to provide an elongated channel-shaped portion 24 for receiving a lacer-like retainer 25 which holds the screen 13 taut between the upper and lower frame members 15.

The screen 13, as is best shown in Fig. 3, comprises horizontal slat members 26 spaced apart slightly and disposed at an angle to the horizontal in order to better deflect light rays passing through the outer glass panel, and vertically extending twisted warp wires 27 for retaining the louvers or slats 26 in their horizontal and angular positions. The lacer-like retainer 25 is formed with loop portions 28 spaced apart by the same distance as the spacing between adjacent pairs of warp wires 27 and, therefore, the lacer-like retainer 25 is threaded into the space between adjacent louvers 26 with the loops 28 receiving the respective pairs of warp wires 27. The lacer-like retainer 25 is then inserted into the elongated channel 24 and the flange portion 29 of the insert 21 functions to retain the lacer-like retainer 25 within the recess 24.

At the vertically extending sides of the glazing unit, the inserts 21 are mounted therein but the lacer-like retainer 25 is omitted, with the ends of the louvers 26 merely projecting into the space between the flange 29 and the end of portion 20 of the framing member 15 disposed at the ends.

As is best shown in Fig. 3, at each corner of the glazing unit, the framing members 15 are mitered and the inserts 21 are mitered in order to provide a neat appearing corner. An L-shaped corner member 30 is adapted to be received within the adjacent ends of cavities 17 of each of the framing members 15 in order to provide a rigid structure. The remaining portions of the cavities 17 are filled with some suitable moisture absorbent material such as silica gel.

When the glazing units are assembled it is desirable to have the space between the glass panels 11 and 12 as substantially air tight as possible, and therefore, suitable sealing material is disposed on the opposite sides of the framing members 15, as indicated at 31 and 32. Similarly, sealing material is disposed as indicated at 33 around the marginal edges of the glass panels 11 and 12 and the framing members 15. Thus, when the outer framing members 16, which are preferably formed of stainless steel, are inserted around the marginal edges of the glazing unit, the glass panels 11 and 12 are held in snug engagement with the framing members 15 and the seals 31, 32 and 33 function to make the glazing unit substantially air tight.

When the glazing unit is to be used in relatively cold climates, there is a tendency for whatever moisture there may be between the glass panels 11 and 12 to collect in the form of a fog on the glass panels and the moisture absorbent 17 functions to absorb this excess moisture in order to prevent this fogging of the panels.

It is contemplated that changes and modifications may be made in the present invention without departing from the spirit or scope thereof.

What is claimed is:

1. A multiple glass sheet glazing unit comprising two spaced parallel sheets of glass, a piece of screen composed of a plurality of symmetrically longitudinally spaced parallel ribbon-like elements disposed with their major surfaces at a predetermined angle to the normal plane of the screen and including a plurality of horizontally spaced longitudinally extending supporting elements extending between said parallel ribbon-like elements, mounting means for said piece of screen comprising horizontal and vertical interconnected frame members each including means defining an elongated recess opening in a direction substantially perpendicular to the normal plane of said screen, means for holding said screen under tension vertically between said horizontal frame members and comprising retainer means having portions disposed between an adjacent pair of said parallel ribbon-like elements at the upper and lower edges of said screen, and a pair of inserts partially disposed within and in holding engagement with the sides of the recesses formed in the respective horizontal frame members, each of said inserts including means defining an elongated channel disposed in the respective horizontal frame members and opening in a direction substantially perpendicular to the normal plane of said screen for respectively receiving other portions of said retainer means for holding said screen and horizontal frame members in assembly, said parallel sheets of glass being disposed on opposite sides of and adjacent to said interconnected frame members with said screen being disposed between and in spaced relation to said sheets of glass, and means for holding said sheets of glass and said screen and frame members in assembly and comprising a metal member of substantially U-shaped cross section disposed around and in abutment with the marginal portions of said glass sheets and said frame members.

2. A multiple glass sheet glazing unit in accordance with claim 1 wherein said horizontal and vertical frame members each include means defining a hollow elongated cavity and there being a moisture absorbent material disposed within each of the cavities.

3. A multiple glass sheet glazing unit in accordance with claim 1 wherein said glass sheets are each sealed at the marginal portions thereof with respect to the horizontal and vertical interconnected frame members to thereby provide a substantially air tight glazing unit.

4. A multiple glass sheet glazing unit in accordance with claim 1 wherein primary sealing means are respectively disposed between each of said glass sheets and said interconnected horizontal and vertical frame members and secondary sealing means are disposed between the marginal portions of the glass sheets and frame members and said metal holding member to thereby provide a substantially air tight glazing unit.

5. A multiple glass sheet glazing unit in accordance with claim 1 wherein said horizontal and vertical frame members each include means defining a hollow elongated cavity and there being a moisture absorbent material disposed within each of the cavities, primary sealing means disposed between each of said glass sheets and said interconnected horizontal and vertical frame members and secondary sealing means disposed between the marginal portions of the glass sheets and frame members and said metal holding member to thereby provide a substantially dry and air tight glazing unit.

References Cited in the file of this patent

UNITED STATES PATENTS

| | | |
|---|---|---|
| 2,318,955 | Milnor | May 11, 1943 |
| 2,526,752 | Horstman et al. | Oct. 24, 1950 |
| 2,545,906 | Watkins | Mar. 20, 1951 |
| 2,630,170 | Ewing | Mar. 3, 1953 |
| 2,838,809 | Zeolla et al. | June 17, 1958 |
| 2,873,486 | Hughes | Feb. 17, 1959 |
| 2,874,423 | Berg | Feb. 24, 1959 |